United States Patent
Van Heuman et al.

(10) Patent No.: US 7,939,574 B2
(45) Date of Patent: May 10, 2011

(54) FOAMED ISOCYANATE-BASED POLYMER HAVING IMPROVED HARDNESS PROPERTIES AND PROCESS FOR PRODUCTION THEREOF

(75) Inventors: Jeffrey D. Van Heuman, Guelph (CA); Paul V. Farkas, Willowdale (CA); Romeo Stanciu, Toronto (CA)

(73) Assignee: Proprietect L.P. (CA)

( * ) Notice: Subject to any disclaimer, the term of this patent is extended or adjusted under 35 U.S.C. 154(b) by 0 days.

(21) Appl. No.: 12/164,615

(22) Filed: Jun. 30, 2008

(65) Prior Publication Data

US 2008/0269369 A1    Oct. 30, 2008

Related U.S. Application Data

(63) Continuation of application No. 09/917,235, filed on Jul. 30, 2001, now abandoned.

(60) Provisional application No. 60/221,511, filed on Jul. 28, 2000.

(51) Int. Cl.
*C08G 18/28* (2006.01)

(52) U.S. Cl. ........ 521/116; 521/134; 521/138; 521/159; 521/163; 521/170; 521/174

(58) Field of Classification Search .................. 521/116, 521/134, 138, 170, 174, 159, 163
See application file for complete search history.

(56) References Cited

U.S. PATENT DOCUMENTS

| | | | |
|---|---|---|---|
| 4,558,120 | A | 12/1985 | Tomalia et al. |
| 5,418,301 | A | 5/1995 | Hult et al. |
| 5,663,247 | A | 9/1997 | Sörenson et al. |
| 6,114,458 | A | 9/2000 | Hawker et al. |
| 6,316,514 | B1 | 11/2001 | Falke et al. |
| 2003/0176591 | A1 | 9/2003 | Haggman |

FOREIGN PATENT DOCUMENTS

| | | |
|---|---|---|
| AU | 2001282733 B | 1/2007 |
| WO | 9619537 A1 | 6/1996 |
| WO | 9749781 A1 | 12/1997 |
| WO | 0056802 A1 | 9/2000 |

OTHER PUBLICATIONS

Magnusson, Helene, et al., "Synthesis of hyperbranched aliphatic polyethers via cationic ringopening polymerization of 3 ethyl-3-(hydroxymethyl) oxetane", Macromol. Rapid Commun., vol. 20, pp. 453-457 (1999).
Grayson, Scott, M., et al., "Synthesis and Surface Functionalization of Aliphatic Polyether Dendrons", J. Am. Chem. Soc., vol. 122, pp. 10335-10344 (2000).
Tomalia et al., Angew. Chem. Int. Ed. Engl. pp. 138-175 (1990).
House, H.O., "Modem Synthetic Reactions", Benj. Cumm. Publ., pp. 16-19 (1972).
Rigid polyurethane foams containing hyperbranched Ppolymers—used to provide dimensional stability as a cheaper alternative to a dendrimer, Research Disclosure RD 411013, Jul. 1998.
International Search Report for PCT application PCT/CA 01/01086 (Dec. 2001).
WPI Database Abstract XP-000471283 (Sep. 1994).
WPI Database Abstract XP-002185357 (Jan. 1998).
WPI Database Abstract XP-002185358 (Sep. 1994).

*Primary Examiner* — John Cooney
(74) *Attorney, Agent, or Firm* — Katten Muchin Rosenman LLP

(57) ABSTRACT

In one of its aspects, the present invention relates to foamed isocyanate-based polymer derived from a reaction mixture comprising an isocyanate, an active hydrogen-containing compound, a dendritic macromolecule and a blowing agent; wherein at least a 15% by weight of the dendritic macromolecule may be mixed with a polyether polyol having an OH number less than about 40 mg KOH/g to form a stable liquid at 23° C. The dendritic macromolecule confers advantageous load building characteristics to the foamed isocyanate-based polymer and may be used to partially or fully displace the use of conventional copolymer polyols used. A process for production of a foam isocyanate-based polymer and a process for conferring loading building properties to a foamed isocyanate-based polymer are also described.

62 Claims, No Drawings

FOAMED ISOCYANATE-BASED POLYMER HAVING IMPROVED HARDNESS PROPERTIES AND PROCESS FOR PRODUCTION THEREOF

CROSS-REFERENCE TO RELATED APPLICATION

This application is a continuation of U.S. patent application Ser. No. 09/917,235, filed Jul. 30, 2001 (abandoned), which claims the benefit under 35 U.S.C. §119(e) of provisional Patent Application No. 60/221,511, filed Jul. 28, 2000, the contents of both of which are hereby incorporated by reference.

BACKGROUND OF THE INVENTION

1. Field of the Invention

In one of its aspects, the present invention relates to a foamed isocyanate-based polymer having improved hardness properties. In another of its aspects, the present invention relates to a process for the production of such a foamed isocyanate-based polymer. In yet another of its aspects, the present invention relates to a method for improving the hardness characteristics of an isocyanate-based foam. In yet another of its aspects, the present invention relates to a dispersion of a dendritic macromolecule and an active hydrogen-containing compound useful in the production of foamed isocyanate-based polymer.

2. Description of the Prior Art

Isocyanate-based polymers are known in the art. Generally, those of skill in the art understand isocyanate-based polymers to be polyurethanes, polyureas, polyisocyanurates and mixtures thereof.

It is also known in the art to produce foamed isocyanate-based polymers. Indeed, one of the advantages of isocyanate-based polymers compared to other polymer systems is that polymerization and foaming can occur in situ. This results in the ability to mould the polymer while it is forming and expanding.

One of the conventional ways to produce a polyurethane foam is known as the "one-shot" technique. In this technique, the isocyanate, a suitable polyol, a catalyst, water (which acts as a reactive "blowing" agent and can optionally be supplemented with one or more physical blowing agents) and other additives are mixed together at once using, for example, impingement mixing (e.g., high pressure). Generally, if one were to produce a polyurea, the polyol would be replaced with a suitable polyamine. A polyisocyanurate may result from cyclotrimerization of the isocyanate component. Urethane modified polyureas or polyisocyanurates are known in the art. In either scenario, the reactants would be intimately mixed very quickly using a suitable mixing technique.

Another technique for producing foamed isocyanate-based polymers is known as the "prepolymer" technique. In this technique, a prepolymer is produced by reacting polyol and isocyanate (in the case of a polyurethane) in an inert atmosphere to form a liquid polymer terminated with reactive groups (e.g., isocyanate moieties and active hydrogen moieties). To produce the foamed polymer, the prepolymer is thoroughly mixed with a lower molecular weight polyol (in the case of producing a polyurethane) or a polyamine (in the case of producing a modified polyurea) in the presence of a curing agent and other additives, as needed.

Regardless of the technique used, it is known in the art to include a filler material in the reaction mixture. Conventionally, filler materials have been introduced into foamed polymers by loading the filler material into one or both of the liquid isocyanate and the liquid active hydrogen-containing compound (i.e., the polyol in the case of polyurethane, the polyamine in the case of polyurea, etc.). Generally, incorporation of the filler material serves the purpose of conferring so-called loaded building properties to the resulting foam product.

The nature and relative amounts of filler materials used in the reaction mixture can vary, to a certain extent, depending on the desired physical properties of the foamed polymer product, and limitations imposed by mixing techniques, the stability of the system and equipment imposed limitations (e.g., due to the particle size of the filler material being incompatible with narrow passages, orifices and the like of the equipment).

One known technique of incorporating a solid material in the foam product for the purpose of improving hardness properties involves the use of a polyol-solids dispersion, particularly one in the form of a graft copolymer polyol. As is known in the art, graft copolymer polyols are polyols, preferably polyether polyols, which contain other organic polymers. It is known that such graft copolymer polyols are useful to confer hardness (i.e., load building) to the resultant polyurethane foam compared to the use of polyols which have not been modified by incorporating the organic polymers. Within graft copolymer polyols, there are two main categories which may be discussed: (i) chain-growth copolymer polyols, and (ii) step-growth copolymer polyols.

Chain-growth copolymer polyols generally are prepared by free radical polymerization of monomers in a polyol carrier to produce a free radical polymer dispersed in the polyol carrier. Conventionally, the free radical polymer can be based on acrylonitrile or styrene-acrylonitrile (SAN). The solids content of the polyol is typically up to about 60%, usually in the range of from about 15% to about 40%, by weight of the total weight of the composition (i.e., free radical polymer and polyol carrier). Generally, these chain-growth copolymer polyols have a viscosity in the range of from about 2,000 to about 8,000 centipoise. When producing such chain-growth copolymer polyols, it is known to induce grafting of the polyol chains to the free-radical polymer.

Step-growth copolymer polyols generally are characterized as follows: (i) PHD (Polyharnstoff Disperion) polyols, (ii) PIPA (Poly Isocyanate Poly Addition) polyols, and (iii) epoxy dispersion polyols. PHD polyols are dispersions of polyurea particles in conventional polyols and generally are formed by the reaction of a diamine (e.g., hydrazine) with a diisocyanate (e.g., toluene diisocyanate) in the presence of a polyether polyol. The solids content of the PHD polyols is typically up to about 50%, usually in the range of from about 15% to about 40%, by weight of the total weight of the composition (i.e., polyurea particles and polyol carrier). Generally, PHD polyols have a viscosity in the range of from about 2,000 to about 6,000 centipoise. PIPA polyols are similar to PHD polyols but contain polyurethane particles instead of polyurea particles. The polyurethane particles in PIPA polyols are formed in situ by reaction of an isocyanate and alkanolamine (e.g., triethanolamine). The solids content of the PIPA polyols is typically up to about 80%, usually in the range of from about 15% to about 70%, by weight of the total weight of the composition (i.e., polyurethane particles and polyol carrier). Generally, PIPA polyols have a viscosity in the range of from about 4,000 to about 50,000 centipoise. See, for example, U.S. Pat. Nos. 4,374,209 and 5,292,778. Epoxy dispersion polyols are based on dispersions of cured epoxy resins in conventional based polyols. The epoxy particles are purportedly high modulus solids with improved hydrogen bonding characteristics.

Further information regarding useful graft copolymer polyols may be found, for example, in Chapter 2 of "Flexible Polyurethane Foams" by Herrington and Hock (1997) and the references cited therein.

Despite the advances made in the art, there exists a continued need for the development of novel load building techniques. Specifically, many of the prior art approaches discussed hereinabove involve the use of relatively expensive materials (e.g., the graft copolymer polyols described above) which can be complicated to utilize in a commercial size facility. Thus, it would be desirable to have a load building technique which could be conveniently applied to polyurethane foam as an alternative to conventional load building techniques. It would be further desirable if the load building technique: was relatively inexpensive and/or improved other properties of the polyurethane foam and/or could be incorporated into an existing production scheme without great difficulty.

SUMMARY OF THE INVENTION

It is an object of the present invention to provide a novel isocyanate-based polymer foam which obviates or mitigates at least one of the above-mentioned disadvantages of the prior art.

It is another object of the present invention to provide a novel approach to conferring load building properties to an isocyanate-based polymer foam.

It is yet another object of the present invention to provide a novel process for production of an isocyanate-based polymer foam.

Accordingly, in one of its objects, the present invention provides a foamed isocyanate-based polymer derived from a reaction mixture comprising an isocyanate, an active hydrogen-containing compound, a dendritic macromolecule and a blowing agent; wherein at least a 15% by weight of the dendritic macromolecule may be mixed with a polyether polyol having an OH number less than about 40 mg KOH/g to form a stable liquid at 23° C.

In another of its aspects, the present invention provides a foamed isocyanate-based polymer derived from an isocyanate and an active hydrogen-containing compound, the polymer having a cellular matrix comprising a plurality of interconnected struts, the active hydrogen-containing compound conferring to the cellular matrix a load efficiency of at least about 15 Newtons (preferably from about 15 to about 50 Newtons, more preferably from about 20 to about 45 Newtons, most preferably from about 25 to about 35 Newtons).

In yet another of its aspects, the present invention provides a foamed isocyanate-based polymer having a cellular matrix comprising a plurality of interconnected struts, the cellular matrix: (i) having a load efficiency of at least about 15 Newtons, and (ii) being substantially free of particulate material.

In yet another of its aspects, the present invention provides a process for producing a foamed isocyanate-based polymer comprising the steps of: (i) contacting an isocyanate, an active hydrogen-containing compound, a dendritic macromolecule and a blowing agent to form a reaction mixture; and (ii) expanding the reaction mixture to produce the foamed isocyanate-based polymer; (iii) wherein at least a 15% by weight of the dendritic macromolecule may be mixed with a polyether polyol having an OH number less than about 40 mg KOH/g to form a stable liquid at 23E C. In yet another of its aspects, the present invention provides a composition of matter comprising an isocyanate, an active hydrogen-containing compound, a dendritic macromolecule and a blowing agent; wherein a mixture comprising at least about 15% by weight of the dendritic macromolecule and a polyether polyol having an OH number less than about 40 mg KOH/g forms a stable liquid at 23° C. The present invention utilizes a novel group of dendritic macromolecules which may be conveniently incorporated in polyurethane foam. Surprisingly and unexpectedly, it has been further discovered that the novel group of dendritic macromolecules confer significant load building properties to the polyurethane foam matrix and may be used for this purpose to partially or fully displace current relatively expensive chemical systems which are used to confer load building characteristics to polyurethane foam. This effect will be illustrated below in the Examples section. A feature of the present dendritic macromolecule is that at least a 15% by weight of the dendritic macromolecule may be mixed with a polyether polyol having an OH number less than about 40 mg KOH/g to form a stable liquid at 23EC.

In yet another of its aspects, the present invention provides a foamed isocyanate-based polymer derived from a reaction mixture comprising an isocyanate, an active hydrogen-containing compound, a dendritic macromolecule and a blowing agent; the foamed isocyanate-based polymer having thickness loss when measured pursuant to ASTM D3574 which is less than that of a reference foam produced by substituting a copolymer polyol for the dendritic macromolecule in the reaction mixture, the foamed isocyanate-based polymer and the reference foam having substantially the same density and Indentation Force Deflection when measured pursuant to ASTM D3574.

As used throughout this specification, the term "isocyanate-based polymer" is intended to mean, inter alia, polyurethane, polyurea and polyisocyanurate. Further, the terms "dendritic polymer" and "dendritic macromolecule" are used interchangeably throughout this specification. These materials are generally known in the art. See, for example, any one of: Tomalia et al in Angew. Chem. Int. Ed. Engl. 29 pages 138-175 (1990); U.S. Pat. No. 5,418,301 [Hult et al (Hult)]; and U.S. Pat. No. 5,663,247 [Sörensen et al (Sörensen)].

The present inventors have surprisingly and unexpectedly discovered that a sub-group of dendritic macromolecules is particularly advantageous to confer load building properties in an isocyanate-based foam. Indeed, as will be developed in the Examples hereinbelow, its possible to utilize the sub-group of dendritic macromolecules to partially or fully displace copolymer polyols conventionally used to confer load building characteristics to isocyanate-based polymer foams. The sub-group of dendritic macromolecules is described in detail in copending U.S. patent application Ser. No. 60/221,512, filed on Jul. 28, 2000 in the name of Pettersson et al. and the contents of which are hereby incorporated by reference.

Preferred aspects of the present invention relate to the ability to mix at least about 15% by weight of the dendritic macromolecule with a polyether polyol having an OH number less than about 40 mg KOH/g to form a stable liquid at 23° C. As used throughout this specification, the term "stable liquid", when used in connection with this solubility parameter of the dendritic macromolecule, is intended to mean that the liquid formed upon mixing the dendritic macromolecule and the polyol has a substantial constant light transmittance (transparent at one extreme and opaque at the other extreme) for at least 2 hours, preferably at least 30 days, more preferably a number of months, after production of the mixture. Practically, in one embodiment, the stable liquid will be in the form a clear, homogeneous liquid (e.g., a solution) which will remain as such over time. In another embodiment, the stable liquid will be in the form an emulsion of (at least a portion of) the dendritic macromolecule in the polyol which will remain as such over time—i.e., the dendritic macromolecule will not settle out over time.

DETAILED DESCRIPTION OF THE PREFERRED EMBODIMENTS

The present invention is related to foamed isocyanate-based polymer and to a process for production thereof. Preferably, the isocyanate-based polymer is selected from the group comprising polyurethane, polyurea, polyisocyanurate, urea-modified polyurethane, urethane-modified polyurea, urethane-modified polyisocyanurate and urea-modified polyisocyanurate. As is known in the art, the term "modified", when used in conjunction with a polyurethane, polyurea or polyisocyanurate means that up to 50% of the polymer backbone forming linkages have been substituted.

The present foamed isocyanate-based polymer is produced from a reaction mixture which comprises an isocyanate and an active hydrogen-containing compound.

The isocyanate suitable for use in the reaction mixture is not particularly restricted and the choice thereof is within the purview of a person skilled in the art. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g., an alkylene or arylene group). Moreover, Q may be represented by the general formula:

$$Q^1\text{-}Z\text{-}Q^1$$

wherein $Q^1$ is an alkylene or arylene group and Z is chosen from the group comprising —O—, —O-$Q^1$-, —CO—, —S—, —S-$Q^1$-S— and —SO$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$OCH$_2$O)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4"-triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. Since the process of the present invention may relate to the production of polyurea foams, it will be appreciated that in this embodiment, the prepolymer could be used to prepare a polyurethane modified polyurea.

In another embodiment, the isocyanate compound suitable for use in the process of the present invention may be selected from dimers and trimers of isocyanates and diisocyanates, and from polymeric diisocyanates having the general formula:

$$[Q''(NCO)_i]_j$$

wherein both i and j are integers having a value of 2 or more, and Q" is a polyfunctional organic radical, and/or, as additional components in the reaction mixture, compounds having the general formula:

$$L(NCO)_i$$

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides (QSO$_2$NCO), cyanic acid and thiocyanic acid.

See also for example, British patent number 1,453,258, for a discussion of suitable isocyanates.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof. A more preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate. Another more preferred isocyanate is selected from the group comprising 2,4'-diphenylmethane diisocyanate, 4,4'-diphenylmethane diisocyanate and mixtures thereof. The most preferred isocyanate is a mixture comprising from about 15 to about 25 percent by weight 2,4'-diphenylmethane diisocyanate and from about 75 to about 85 percent by weight 4,4'-diphenylmethane diisocyanate.

If the process is utilized to produce a polyurethane foam, the active hydrogen-containing compound is typically a polyol. The choice of polyol is not particularly restricted and is within the purview of a person skilled in the art. For example, the polyol may be a hydroxyl-terminated backbone of a member selected from the group comprising polyether, polyester, polycarbonate, polydiene and polycaprolactone. Preferably, the polyol is selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. More preferred polyols are selected from the group comprising adipic acid-ethylene glycol polyester, poly(butylene glycol), poly(propylene glycol) and hydroxyl-terminated polybutadiene—see, for example, British patent number 1,482,213, for a discussion of suitable polyols. Preferably, such a polyether polyol has a molecular weight in the range of from about 200 to about 10,000, more preferably from about 2,000 to about 7,000, most preferably from about 2,000 to about 6,000.

If the process is utilized to produce a polyurea foam, the active hydrogen-containing compound comprises compounds wherein hydrogen is bonded to nitrogen. Preferably such compounds are selected from the group comprising polyamines, polyamides, polyimines and polyolamines, more preferably polyamines. Non-limiting examples of such compounds include primary and secondary amine terminated polyethers. Preferably such polyethers have a molecular weight of greater than about 230 and a functionality of from 2 to 6. Such amine terminated polyethers are typically made from an appropriate initiator to which a lower alkylene oxide is added with the resulting hydroxyl terminated polyol being subsequently aminated. If two or more alkylene oxides are used, they may be present either as random mixtures or as blocks of one or the other polyether. For ease of amination, it is especially preferred that the hydroxyl groups of the polyol be essentially all secondary hydroxyl groups. Typically, the amination step replaces the majority but not all of the hydroxyl groups of the polyol.

The reaction mixture used to produce the present foamed isocyanate-based polymer typically will further comprise a blowing agent. As is known in the art water can be used as an indirect or reactive blowing agent in the production of foamed isocyanate-based polymers. Specifically, water reacts with the isocyanate forming carbon dioxide which acts as the effective blowing agent in the final foamed polymer product. Alternatively, the carbon dioxide may be produced by other means such as unstable compounds which yield carbon dioxide (e.g., carbamates and the like). Optionally, direct organic blowing agents may be used in conjunction with water although the use of such blowing agents is generally being curtailed for environmental considerations. The preferred blowing agent for use in the production of the present foamed isocyanate-based polymer comprises water.

It is known in the art that the amount of water used as an indirect blowing agent in the preparation of a foamed isocyanate-based polymer is conventionally in the range of from about 0.5 to as high as about 40 or more parts by weight, preferably from about 1.0 to about 10 parts by weight, based on 100 parts by weight of the total active hydrogen-containing compound content in the reaction mixture. As is known in the art, the amount of water used in the production of a foamed isocyanate-based polymer typically is limited by the fixed properties expected in the foamed polymer and by the tolerance of the expanding foam towards self structure formation.

The reaction mixture used to produce the present foamed isocyanate-based polymer typically will further comprise a catalyst. The catalyst used in the reaction mixture is a compound capable of catalyzing the polymerization reaction. Such catalysts are known, and the choice and concentration thereof in the reaction mixture is within the purview of a person skilled in the art. See, for example, U.S. Pat. Nos. 4,296,213 and 4,518,778 for a discussion of suitable catalyst compounds. Non-limiting examples of suitable catalysts include tertiary amines and/or organometallic compounds. Additionally, as is known in the art, when the objective is to produce an isocyanurate, a Lewis acid must be used as the catalyst, either alone or in conjunction with other catalysts. Of course it will be understood by those skilled in the art that a combination of two or more catalysts may be suitably used.

In a preferred aspect of the present invention a dendritic macromolecule is incorporated in the present foamed isocyanate-based polymer. Preferably, the dendritic macromolecule has the following characteristics: (i) an active hydrogen content of greater than about 3.8 mmol/g, more preferably greater than about 4.0 mmol/g, even more preferably in the range of from about 3.8 to about 10 mmol/g; even more preferably in the range of from about 3.8 to about 7.0 mmol/g; even more preferably in the range of from about 4.0 to about 8.0 mmol/g; most preferably in the range of from about 4.4 to about 5.7 mmol/g; (ii) an active hydrogen functionality of at least about 8; more preferably at least about 16; even more preferably in the range of from about 16 to about 70; even more preferably in the range of from about 18 to about 60; even more preferably in the range of from about 17 to about 35; most preferably in the range of from about 20 to about 30; (iii) at least about 15%, more preferably from about 15% to about 50%, even more preferably from about 15% to about 40%, even more preferably from about 15% to about 30%, by weight of the dendritic macromolecule may be mixed with a polyether polyol having an OH number less than about 40, more preferably from about 25 to about 35, mg KOH/g to form a stable liquid at 23° C.

Further details on the dendritic macromolecule may be obtained from copending U.S. patent application Ser. No. 10/343,046, claiming benefit of Ser. No. 60/221,512, filed on Jul. 28, 2000 and from International patent application PCT/SE01/01518, filed on Jul. 2, 2001 (claiming priority from the '512 application), both in naming Pettersson et al. In particular, as stated above, the present dendritic macromolecules are characterized by: (i) an active hydrogen content of greater than about 3.8 mmol/g; (ii) an active hydrogen functionality of at least about 8; and (iii) at least a 15% by weight of the dendritic macromolecule may be mixed with a polyether polyol having an OH number less than about 40 mg KOH/g to form a stable liquid at 23E C. As used throughout this specification, the term "active hydrogen functionality" is intended to mean the number of active hydrogen moieties per molecule of the dendritic macromolecule. The general architecture of the present dendritic macromolecules is similar to other such macromolecules. Specifically, the present dendritic macromolecules may be derived from: (a) a central monomeric or polymeric nucleus, (b) at least one generation of a branching monomeric or polymeric chain extender have a plurality of reactive sites comprising an active hydrogen-containing moiety, and (c) optionally, at least one monomeric or polymeric chain stopper which serves to terminate the macromolecule. The central monomeric or polymeric nucleus included in the hyperbranched macromolecule is not particularly restricted and, in a preferred embodiment, is suitably selected from the groups of central monomeric or polymeric initiators disclosed in Hult and Sörensen referred to above and the contents of each of which are hereby incorporated by reference. The chain extender(s) included in the hyperbranched macromolecule is not particularly restricted and, in a preferred embodiment, is suitably selected from the groups of chain extenders disclosed in Hult and Sörensen referred to above and the contents of each of which are hereby incorporated by reference. The chain stopper, if used in the hyperbranched macromolecule is not particularly restricted and, in a preferred embodiment, is suitably selected from the groups of chain stoppers disclosed in Hult and Sörensen referred to above and the contents of each of which are hereby incorporated by reference. The present dendritic macromolecules may be of the so-called ester type, for example, as described by Hult and Sörensen. Alternatively, the present dendritic macromolecules may be of the so-called ether type, for example, as described by Magnusson et al. in Macromol. Rapid Commun. 20, 453-457 (1999). Further, the dendritic macromolecule need not necessarily include a central monomeric or polymeric initiator. Specifically, the macromolecule may be a polymer derived directly from the chain extender (s)—this will be illustrated in Example G. As will be developed hereinbelow in the Examples (see particularly Example G), it is possible to select the chain extender to achieve a dendritic macromolecule having solubility parameter (iii) set out above, without the need for the use of a chain stopper.

As will be clearly understood by those of skill in the art, it is contemplated that conventional additives in the polyurethane foam art can be incorporated in the reaction mixture created during the present process. Non-limiting examples of such additives include: surfactants (e.g., organo-silicone compounds available under the tradename L-540 Union Carbide), cell openers (e.g., silicone oils), extenders (e.g., halogenated paraffins commercially available as Cereclor S45), cross-linkers (e.g., low molecular weight reactive hydrogen-containing compositions), pigments/dyes, flame retardants (e.g., halogenated organo-phosphoric acid compounds), inhibitors (e.g., weak acids), nucleating agents (e.g., diazo compounds), anti-oxidants, and plasticizers/stabilizers (e.g., sulphonated aromatic compounds). The amounts of these additives conventionally used would be within the purview of a person skilled in the art.

The following Examples illustrate the use of the dendritic polymer in a typical isocyanate-based high resilience (HR) based foam. In each Example, the isocyanate-based foam was prepared by the pre-blending of all resin ingredients including polyols, copolymer polyols, catalysts, water, and surfactants as well as the dendritic macromolecule of interest. The isocyanate was excluded from this mixture. The resin blend and isocyanate were then mixed at an isocyanate index of 100 using a conventional two-stream mixing technique and dispensed into a preheated mold (65° C.) having the dimensions 38.1 cm×38.1 cm×10.16 cm. The mold was then closed and the reaction allowed to proceed until the total volume of the mold was filled. After approximately 6 minutes, the isocyanate-based foam was removed and, after proper conditioning, the properties of interest were measured. This methodology will be referred to in the following Examples as the General Procedure.

In the Examples, the following materials were used:

E837, base polyol, commercially available from Lyondell;
E850, a 43% solids content copolymer (SAN) polyol, commercially available from Lyondell;
HBP, a dendritic macromolecule produced in Example A hereinbelow and discussed in more detail in copending U.S. patent application Ser. No. 60/221,512, filed on Jul. 28, 2000 in the name of Pettersson et al.;
DEAOLF, diethanolamine, a cross-linking agent commercially available from Air Products;
Glycerin, a cross-linking agent, commercially available from Van Waters & Rogers;
Water, indirect blowing agent;
Dabco 33LV, a gelation catalyst, commercially available from Air Products;
Niax A-1, a blowing catalyst, commercially available from Witco;
DC 5169, a surfactant, commercially available from Air Products;
Y-10184, a surfactant, commercially available from Witco; and
Lupranate T80, isocyanate (TDI), commercially available from BASF.
Unless otherwise stated, all parts reported in the Examples are parts by weight.

EXAMPLE A 100.0 kg of an alkoxylated pentaerythritol with a hydroxyl value of 630 mg KOH/g, 1055 kg of 2,2-dimethylolpropionic acid (Bis-MPA, Perstorp Specialty Chemicals) and 8.5 kg of paratoluenic sulphonic acid were cold mixed in a reactor equipped with a heating system with accurate temperature control, a mechanical stirrer, a pressure gauge, a vacuum pump, a cooler, nitrogen inlet and a receiver. The mixture was heated carefully during slow stirring to a temperature of 140° C. Slow stirring of the mixture at this temperature was maintained at atmospheric pressure until all 2,2-dimethylopropionic acid was dissolved and the reaction mixture formed a fully transparent solution. The stirring speed was then significantly increased and vacuum was applied to a pressure of 30 mbar. Reaction water immediately started to form, which was collected in the receiver. The reaction was allowed to continue for a further 7 hours, until a final acid value of 8.9 mg KOH/g was obtained. This corresponded to a chemical conversion of ~98%.

The obtained dendritic polymer had the following characteristics:

| | |
|---|---|
| Final acid value: | 8.9 mg KOH/g |
| Final hydroxyl value: | 489 mg KOH/g |
| Peak molecular weight: | 3490 g/mole |
| Mw (SEC): | 3520 g/mole |
| Mn (SEC): | 2316 g/mole |
| PDI (Mw/Mn): | 1.52 |
| Average hydroxyl functionality: | 30.4 OH-groups/molecule |

The obtained properties were in good agreement with the expected theoretical molecular weight of 3607 g/mole at 100% chemical conversion and a theoretical hydroxyl value of 498 mg KOH/g, which would correspond to a OH-functionality of 32.

25.0 kg of the dendritic polymer, 8.4 kg of an aliphatic acid with nine carbons with an acid value of 363 mg KOH/g and 3.3 kg of xylene were charged to a reactor equipped with a heating system with accurate temperature control, a mechanical stirrer, a pressure gauge, a vacuum pump, a dean-stark device for azeotropic removal of water, a cooler, nitrogen inlet and a receiver. The mixture was heated under stirring with a nitrogen flow of 500-600 l/h through the reaction mixture from room temperature up to 170° C. At this temperature all xylene was refluxing and the reaction water which started to form was removed by azeotropic distillation. The reaction was allowed to continue for a further 1.5 hours at 170° C., after which the reaction temperature was increased to 180° C. The reaction mixture was kept at this temperature for a further 2.5 hours until an acid value of 5.7 mg KOH/g was obtained. Full vacuum was then applied to the reactor to remove all xylene from the final product.

The obtained derivatized dendritic polymer had the following characteristics:

| | |
|---|---|
| Final acid value: | 6.2 mg KOH/g |
| Final hydroxyl value: | 293 mg KOH/g |
| Peak molecular weight: | 4351 g/mole |
| Mw (SEC): | 4347 g/mole |
| Mn (SEC): | 1880 g/mole |
| PDI (Mw/Mn): | 2.31 |
| Average hydroxyl functionality: | 22.7 OH-groups/molecule |

The obtained properties were in good agreement with the expected theoretical molecular weight of 4699 g/mole at 100% chemical conversion and a theoretical hydroxyl value of 287 mg KOH/g, which would correspond to a OH-functionality of 24.

EXAMPLES 1-4

In Examples 1-4, isocyanate-based foams based on the formulations shown in Table 1 were produced using the General Procedure referred to above. In these Examples, isocyanate-based foams were prepared having a copolymer polyol concentration of 7% (Examples 1 and 3) and 11% (Examples 2 and 4) by weight of resin and having a % $H_2O$ concentration of 3.80% which results in an approximate foam core density of 31 kg/m³. For each level of copolymer polyol concentration, the dendritic macromolecule concentration was increased from 2% by weight of resin (Examples 1 and 2) to 5% by weight of resin (Examples 3 and 4).

Also reported in Table 1 for each foam is the density and Indentation Force Deflection (IFD) at 50% deflection, measured pursuant to ASTM D3574. As shown, the introduction of the dendritic macromolecule to the isocyanate-based polymer matrix resulted in a 70 N hardness increase for foam containing 7% copolymer (Examples 1 and 3) and a 100N hardness increase for the foam containing 11% copolymer polyol (Examples 2 and 4).

By this analysis, a "load efficiency", having units of Newtons/weight % dendritic macromolecule in the resin blend, for each foam may be reported and represents the ability of the dendritic macromolecule to generate firmness in the isocyanate-based foam matrix. As used throughout this specification in connection with the present invention, the term "load efficiency" is defined as the number of Newtons of foam hardness increase per weight % of the dendritic macromolecule added to a base or control resin blend (i.e., typically comprising all ingredients in the foamable composition except the iscocyanate). The term "load efficiency", as used throughout this specification, is intended to have the meaning set out in this paragraph.

For Examples 1 and 3, the load efficiency of the dendritic macromolecule was determined to be 23.78 Newtons/weight % dendritic macromolecule in the resin blend while for Examples 2 and 4, the load efficiency was determined to be 33.42 Newtons/weight % dendritic macromolecule in the resin blend.

EXAMPLES 5-8

In Examples 5-8, isocyanate-based foams based on formulations shown in Table 2 were produced using the General Procedure referred to above.

In these Examples, isocyanate-based foams were prepared having copolymer polyol concentrations as those used in Examples 1-4 with a % $H_2O$ concentration of 3.2% which results in an approximate core foam density of 36 kg/m³. For each copolymer polyol level used the dendritic macromolecule concentration was increased from 2% to 5% by weight of resin.

The results of physical property testing are reported in Table 2. As shown, in these Examples, the introduction of the dendritic macromolecule to the isocyanate-based polymer matrix resulted in a 61 Newtons/weight % dendritic macromolecule in the resin blend hardness increase for the foam containing 7% copolymer polyol and a 72 Newtons/weight % dendritic macromolecule in the resin blend hardness increase for the foam containing 11% copolymer polyol. The resulting load efficiency for Examples 5 and 7 was determined to be 20.4 Newtons/weight % dendritic macromolecule in the resin blend while for Examples 6 and 8 the load efficiency was determined to be 23.9 Newtons/weight % dendritic macromolecule in the resin blend.

EXAMPLES 9-11

In Examples 9-11, isocyanate-based foams based on the formulations shown in Table 3 were produced using the General Procedure referred to above.

In these Examples, isocyanate based foams were prepared in the absence of any copolymer polyol. The isocyanate-based foams were formulated with a % $H_2O$ concentration of 3.8% resulting in an approximate foam core density of 31 kg/m³. The level of the dendritic macromolecule was varied from 6.68% to 13.35% by weight in the resin.

The results of physical property testing are reported in Table 3. As shown, the introduction of the dendritic macromolecule resulted in a foam hardness increase of 181 Newtons. The load efficiency was calculated by plotting, for each Example, % HBP in the resin (X-axis) versus 50% IFD (Y-axis) and using Sigma Plot™ to plot the line of best fit. The slope of the resulting curve was obtained and reported as the load efficiency, in this case: 27 Newtons/weight % dendritic macromolecule in the resin blend.

EXAMPLES 12-14

In Examples 12-14, isocyanate based foams based on the formulations shown in Table 4 were produced using the General Procedure referred to above.

In these Examples, isocyanate based foams were prepared in the absence of any copolymer polyol. The isocyanate-based foams were formulated with a % $H_2O$ concentration of 3.2% resulting in an approximate foam core density of 36 kg/m³. The level of the dendritic macromolecule was varied from 6.72% to 13.43% by weight in the resin.

The results of physical property testing are reported in Table 4. As shown, the introduction of the dendritic macromolecule resulted in a foam hardness increase of 202.5 Newtons. The load efficiency was obtained in the same manner as described in Examples 9-11 and was found to be 30.18 Newtons/weight % dendritic macromolecule in the resin blend.

EXAMPLES 15-16

In Examples 15 and 16, isocyanate-based foams based on the formulations shown in Table 5 were produced using the General Procedure referred to above.

In these Examples, isocyanate based foams were prepared in the absence of any dendritic macromolecule and used only copolymer polyol as the method by which foam hardness is increased. Thus, it will be appreciated that Examples 15 and 16 are provided for comparative purposes only and are outside the scope of the present invention. The isocyanate-based foams were formulated with a % $H_2O$ concentration of 3.8% resulting in an approximate foam core density of 31 kg/m³. The level of the copolymer polyol was varied from 26% to 8% by weight in the resin.

The results of physical property testing are reported in Table 4. As shown, the introduction of the copolymer polyol resulted in a foam hardness increase of 192.1 Newtons. The resulting load efficiency is 10.69 Newtons/weight % dendritic macromolecule in the resin blend. As will be apparent, this is significantly less than the load efficiency achieved in the foams produced in Examples 1-14.

EXAMPLE B 16.7 kg of an alkoxylated pentaerythritol with a hydroxyl value of 630 mg KOH/g, 375 kg of 2,2-dimethylolpropionic acid (Bis-MPA, Perstorp Specialty Chemicals) and 3.0 kg of paratoluenic sulphonic acid were cold mixed in a reactor equipped with a heating system with accurate temperature control, a mechanical stirrer, a pressure gauge, a vacuum pump, a cooler, nitrogen inlet and a receiver. The mixture was heated carefully during slow stirring to a temperature of 140EC. Slow stirring of the mixture at this temperature was maintained at atmospheric pressure until all 2,2-dimethylopropionic acid was dissolved and the reaction mixture formed a fully transparent solution. The stirring speed was then significantly increased and vacuum was applied to a pressure of 30 mbar. Reaction water immediately started to form, which was collected in the receiver. The reaction was allowed to continue for a further 8 hours, until a final acid value of 11.9 mg KOH/g was obtained. This corresponded to a chemical conversion of ~97%.

The obtained dendritic polymer had the following characteristics:

| | |
|---|---|
| Final acid value: | 11.9 mg KOH/g |
| Final hydroxyl value: | 481 mg KOH/g |
| Peak molecular weight: | 5110 g/mole |
| Mw (SEC): | 5092 g/mole |
| Mn (SEC): | 3041 g/mole |
| PDI (Mw/Mn): | 1.67 |
| Average hydroxyl functionality: | 43.8 OH-groups/molecule |

The obtained properties were in good agreement with the expected theoretical molecular weight of 7316 g/mole at 100% chemical conversion and a theoretical hydroxyl value of 491 mg KOH/g, which would correspond to a OH-functionality of 64.

EXAMPLE C 83.6 kg of an alkoxylated pentaerythritol with a hydroxyl value of 630 mg KOH/g, 375.0 kg of 2,2-dimethylolpropionic acid (Bis-MPA, Perstorp Specialty Chemicals) and 3.25 kg of paratoluenic sulphonic acid were cold mixed in a reactor equipped with a heating system with accurate temperature control, a mechanical stirrer, a pressure gauge, a vacuum pump, a cooler, nitrogen inlet and a receiver. The mixture was heated carefully during slow stirring to a temperature of 140EC. Slow stirring of the mixture at this temperature was maintained at atmospheric pressure until all 2,2-dimethylopropionic acid was dissolved and the reaction mixture formed a fully transparent solution. The stirring speed was then significantly increased and vacuum was applied to a pressure of 30 mbar. Reaction water immediately started to form, which was collected in the receiver. The reaction was allowed to continue for a further 7.5 hours, until a final acid value of 6.0 mg KOH/g was obtained. This corresponded to a chemical conversion of ~98%.

The obtained dendritic polymer had the following characteristics:

| | |
|---|---|
| Final acid value: | 4.7 mg KOH/g |
| Final hydroxyl value: | 508 mg KOH/g |
| Peak molecular weight: | 1998 g/mole |
| Mw (SEC): | 1997 g/mole |
| Mn (SEC): | 1451 g/mole |
| PDI (Mw/Mn): | 1.37 |
| Average hydroxyl functionality: | 18 OH-groups/molecule |

The obtained properties were in good agreement with the expected theoretical molecular weight of 1750 g/mole at 100% chemical conversion and a theoretical hydroxyl value of 513 mg KOH/g, which would correspond to a OH-functionality of 16.

EXAMPLE D 25.0 kg of the dendritic polymer according to Example A, 8.4 kg of an aliphatic acid with nine carbons with an acid value of 363 mg KOH/g and 3.3 kg of xylene were charged to a reactor equipped with a heating system with accurate temperature control, a mechanical stirrer, a pressure gauge, a vacuum pump, a dean-stark device for azeotropic removal of water, a cooler, nitrogen inlet and a receiver. The mixture was heated under stirring with a nitrogen flow of 500-600 l/h through the reaction mixture from room temperature up to 170EC. At this temperature all xylene was refluxing and the reaction water which started to form was removed by azeotropic distillation. The reaction was allowed to continue for a further 1.5 hours at 170EC, after which the reaction temperature was increased to 180EC. The reaction mixture was kept at this temperature for a further 2.5 hours until an acid value of 5.7 mg KOH/g was obtained. Full vacuum was then applied to the reactor to remove all xylene from the final product.

The obtained derivatized dendritic polymer had the following characteristics:

| | |
|---|---|
| Final acid value: | 6.2 mg KOH/g |
| Final hydroxyl value: | 293 mg KOH/g |
| Peak molecular weight: | 4351 g/mole |
| Mw (SEC): | 4347 g/mole |
| Mn (SEC): | 1880 g/mole |
| PDI (Mw/Mn): | 2.31 |
| Average hydroxyl functionality: | 22.7 OH-groups/molecule |

The obtained properties were in good agreement with the expected theoretical molecular weight of 4699 g/mole at 100% chemical conversion and a theoretical hydroxyl value of 287 mg KOH/g, which would correspond to a OH-functionality of 24.

EXAMPLE E 25.0 kg of the dendritic polymer according to Example C, 5.25 kg of an aliphatic acid with nine carbons with an acid value of 363 mg KOH/g and 3.0 kg of xylene were charged to a reactor equipped with a heating system with accurate temperature control, a mechanical stirrer, a pressure gauge, a vacuum pump, a dean-stark device for azeotropic removal of water, a cooler, nitrogen inlet and a receiver. The mixture was heated under stirring with a nitrogen flow of 500-600 l/h through the reaction mixture from room temperature up to 180EC. At this temperature all xylene was refluxing and the reaction water which started to form was removed by azeotropic distillation. The reaction was allowed to continue for a further 5 hours at 180EC until an acid value of 6.0 mg KOH/g was reached. Full vacuum was then applied to the reactor to remove all xylene from the final product.

The obtained derivatized dendritic polymer had the following characteristics:

| | |
|---|---|
| Final acid value: | 6.0 mg KOH/g |
| Final hydroxyl value: | 360 mg KOH/g |
| Peak molecular weight: | 2700 g/mole |
| Mw (SEC): | 2733 g/mole |
| Mn (SEC): | 1673 g/mole |
| PDI (Mw/Mn): | 1.61 |
| Average hydroxyl functionality: | 17.3 OH-groups/molecule |

The obtained properties were in reasonable agreement with the expected theoretical molecular weight of 2080 g/mole at 100% chemical conversion and a theoretical hydroxyl value of 367 mg KOH/g, which would correspond to a OH-functionality of 13.6.

EXAMPLE F 25.0 kg of the dendritic polymer according to Example B, 8.3 kg of an aliphatic acid with nine carbons with an acid value of 363 mg KOH/g and 3.3 kg of xylene were charged to a reactor equipped with a heating system with accurate temperature control, a mechanical stirrer, a pressure gauge, a vacuum pump, a dean-stark device for azeotropic removal of water, a cooler, nitrogen inlet and a receiver. The mixture was heated under stirring with a nitrogen flow of 500-600 l/h through the reaction mixture from room temperature up to 180EC. At this temperature all xylene was refluxing and the reaction water which started to form was removed by azeotropic distillation. The reaction was allowed to continue for a further 5 hours at 180EC until an acid value of 6.8 mg KOH/g was reached. Full vacuum was then applied to the reactor to remove all xylene from the final product.

The obtained derivatized dendritic polymer had the following characteristics:

| | |
|---|---|
| Final acid value: | 6.8 mg KOH/g |
| Final hydroxyl value: | 280 mg KOH/g |
| Peak molecular weight: | 5274 g/mole |
| Mw (SEC): | 5245 g/mole |
| Mn (SEC): | 2428 g/mole |
| PDI: | 2.16 |

The obtained properties were in reasonable agreement with the expected theoretical hydroxyl value of 283 mg KOH/g.

EXAMPLE G 200.0 g of trimethylolpropane oxetane (TMPO, Perstorp Specialty Chemicals) was charged to a reactor equipped with a mechanical stirrer, a cooler and a heating system with adequate heating control. 2.0 g of a solution of $BF_3$ etherate (10% in diethylether) was charged at room temperature to the reactor during less than 120 seconds. A strong exotherm was seen as a result of the ring opening polymerization of the oxetane monomer. Once the exotherm faded, the reaction mixture was heated to 150EC and kept at that temperature under stirring for a further 90 minutes. The reaction mixture was then cooled to room temperature at which the final product was recovered.

The obtained dendritic polymer of polyether type had the following characteristics:

| | |
|---|---|
| Final hydroxyl value: | 500 mg KOH/g |
| Peak molecular weight: | 6307 g/mole |
| Mw (SEC): | 5309 g/mole |
| Mn (SEC): | 2011 g/mole |
| PDI: | 2.64 |
| Average hydroxyl functionality: | 56 OH-groups/molecule |
| Chemical conversion: | 99.4% with regard to residual monomer content |

EXAMPLE H

The solubility of each of the dendritic polymers according to Examples A-C in a glycerol based polyether polyol with an hydroxyl value of 32 mg KOH/g was evaluated.

15.0 g of the respective dendritic polymer according to Examples A-C was added to a beaker containing 75.0 g of a glycerol based polyether polyol with a hydroxyl value of 32 mg KOH/g. The mixture was heated under stirring to 120EC during 30 minutes and then allowed to cool down to room temperature. The ability for each dendritic polymer to form a stable solution with the polyether polyol was evaluated after 120 minutes.

None of the dendritic polymers according to Examples A-C were able to form a stable solution with the glycerol-based polyether polyol of hydroxyl value 32 mg KOH/g. The dendritic polymers according to Examples A-C partly precipitated from the solution and this could be observed in the form of a separate phase at the bottom of the beaker.

EXAMPLE I

The solubility of each of the dendritic polymers according to Examples D-F in a glycerol based polyether polyol with an hydroxyl value of 32 mg KOH/g was evaluated.

15.0 g of the respective dendritic polymer according to Examples D-F was added to a beaker containing 75.0 g of a glycerol based polyether polyol with a hydroxyl value of 32 mg KOH/g. The mixture was heated under stirring to 120EC during 30 minutes and then allowed to cool down to room temperature. The ability for each dendritic polymer to form a stable solution with the polyether polyol was evaluated after 120 minutes.

All of the evaluated dendritic polymers according to Examples D-F were fully soluble in the glycerol based polyether polyol. Fully transparent solutions were obtained in all cases, which were stable over time. Due to the excellent solubility, samples of higher concentrations based on the products obtained according to Examples D-F. These were then evaluated with regard to viscosity at 23EC. Samples of different concentrations of dendritic polymer according to Examples D-F in polyether polyol were prepared and found to be fully compatible with the base glycerol based polyether polyol. These stable solutions remained as such even after 30 days.

The attached Figure illustrates the viscosity dependence in a polyether polyol of the products according to Examples D-F. As can be seen from the results illustrated in the attached Figure, very good solubility behaviour of the products according to Examples D-F were obtained.

EXAMPLE J

The solubility of the dendritic polymer of polyether type according to Example G in a glycerol based polyether polyol with an hydroxyl value of 32 mg KOH/g was evaluated.

15.0 g of the dendritic polymer according to Example G was added to a beaker containing 75.0 g of a glycerol based polyether polyol with a hydroxyl value of 32 mg KOH/g. The mixture was heated under stirring to 120EC during 30 minutes and then allowed to cool down to room temperature. The ability for the product according to Example 7 to form a stable solution with the polyether polyol was evaluated after 120 minutes.

It was found that the dendritic polymer of polyether type according to Example G formed an opaque but completely stable solution with the glycerol based polyether polyol.

EXAMPLE K

Synthesis of Amine-Terminated Dendritic Polymer of Polyether Type

An amine terminated dendritic polymer of polyether type is prepared according to the following principal synthesis procedure:

Step 1: A dendritic polymer of polyether type according to Example G and a suitable solvent such as tetrahydrofurane (THF) are charged to a reactor equipped with a mechanical stirrer, a heating system with adequate temperature control, a cooler, gas inlet, a vacuum pump and a receiver. When a transparent solution has been obtained, NaOH or KOH or NaH are added in stoichiometric amount or with a slight excess, at which the dendritic alkolate is formed (RO$^-$Na$^+$).

Step 2: Acrylonitrile is added in a stoichiometric amount with regard to the moles of RO$^-$Na$^+$ species present in the reaction mixture from Step 1. The alkolated species will then undergo an addition to the unsaturation of the acrylonitrile. The obtained product in Step 2 has therefore been converted to a nitrile terminated dendritic polymer of polyether type.

Step 3: The nitrile functionality of the reaction product according to Step 2 is converted to primary amines by: (i) reducing the pH of the reaction solution by adding protons to the solution, (ii) thereafter passing H$_2$ (g) through the reaction mixture in the presence of a reducing catalyst such as Pt, Pd or Raney Ni neat or fixated (e.g., to a carbon carrier); and (iii) thereafter recovering the obtained amine functional dendritic polymer of polyether type by conventional washing and extraction procedures.

Further details on specifics of these reaction steps may be found in House, H. O., Modern Synthetic Reactions, 16-19, Benj. Cumm. Publ. (1972).

EXAMPLE L

Amine-Terminated Dendritic Polymer OF Polyester Type

A fully or partially-amine terminated dendritic polymer of polyester type according to any of the Examples A-F is prepared according to the following principal synthesis procedure:

Step 1: A dendritic polymer of polyester type according to any of the Examples A-F, acrylic acid in a ratio COOH:OH of [0.1:1] to [1:1] with regard to the hydroxyl value of the dendritic polymer and a protonic acid such as methane sulphonic acid (~1 wt % concentration of the total solution), one or several inhibitors for radical polymerisation (e.g., MIHQ or HQ) and a solvent such as toluene or a mixture of, for example, toluene and THF, are charged to a reactor equipped with a mechanical stirrer, a dean-stark separator, adequate temperature control, nitrogen inlet, a cooler and a receiver. The reaction mixture is heated to 100-130EC, typically 110-120EC, at which point the solvent is starting to reflux and water is starting to form. The reaction is allowed to continue at said temperature until a low acid value of 5 B 30 mg KOH/g is reached, preferably 5-15 mg KOH/g. The product is then used as such or further purified by either washing with a weak aqueous solution of NaOH, or the residual acrylic acid is precipitated with, for example, Al$_2$O$_3$.

Step 2: The acrylated product according to Step 1 is then reacted with a primary aliphatic, cycloaliphatic or aromatic amine such as propyl amine, isopropyl amine, octyl amine, butyl amine (m, sec, tert) or benzyl amine. The amine of choice is added in stoichiometric amount or in excess to the acrylated product of Step 1, at which an addition reaction to the unsaturation of the dendritic acrylate will occur. The reaction is either performed at room temperature or a slightly elevated temperatures such as 50EC. The conversion of acrylate to amine is either followed by IR or NIR by the disappearance of acrylate unsaturations, or by GC-analysis of the residual amine content in the reaction mixture. Obtained amine terminated dendritic polymer of polyester type is then recovered by evaporating residual monomer and solvent by applying full vacuum to the reactor.

EXAMPLES M-Q

Examples M-Q illustrate the use of the present dendritic polymer in a typical isocyanate-based high resilience (HR) based foam. In each Example, the isocyanate-based foam was prepared by the pre-blending of all resin ingredients including polyols, copolymer polyols (if used), catalysts, water, and surfactants as well as the dendritic macromolecule of interest (if used). The isocyanate was excluded from this mixture. The resin blend and isocyanate were then mixed at an isocyanate index of 100 using a conventional two-stream mixing technique and dispensed into a preheated mold (65EC) having the dimensions 38.1 cm×38.1 cm×10.16 cm. The mold was then closed and the reaction allowed to proceed until the total volume of the mold was filled. After approximately 6 minutes, the isocyanate-based foam was removed and, after proper conditioning, the properties of interest were measured. This methodology will be referred to in Examples M-Q as the General Procedure.

In Examples M-Q, the following materials were used:
E837, base polyol, commercially available from Lyondell;
E850, a 43% solids content copolymer (SAN) polyol, commercially available from Lyondell;
HBP, a dendritic macromolecule produced in Example D above;
DEAOLF, diethanolamine, a cross-linking agent commercially available from Air Products;
Glycerin, a cross-linking agent, commercially available from Van Waters & Rogers;
Water, indirect blowing agent;
Dabco 33LV, a gelation catalyst, commercially available from Air Products;
Niax A-1, a blowing catalyst, commercially available from Witco; Y-10184, a surfactant, commercially available from Witco; and
Lupranate T80, isocyanate (TDI), commercially available from BASF.

Unless otherwise stated, all parts reported in Examples M-Q are parts by weight.

In Examples M-O, isocyanate-based foams based on the formulations shown in Table 6 were produced using the General Procedure referred to above.

In Examples M-O, isocyanate based foams were prepared in the absence of any copolymer polyol. The isocyanate-based foams were formulated with a % H$_2$O concentration of 3.8% resulting in an approximate foam core density of 31 kg/m$^3$. The level of the dendritic macromolecule was varied from 6.68% to 13.35% by weight in the resin.

The results of physical property testing are reported in Table 6. Also reported in Table 6 for each foam is the density and Indentation Force Deflection (IFD) at 50% deflection, measured pursuant to ASTM D3574. As shown, the introduction of the dendritic macromolecule to the isocyanate-based polymer matrix resulted in a ~98 N hardness increase for foam from Example M to Example N, and a ~83 N hardness increase for the foam from Example N to Example O.

By this analysis, a "load efficiency" for each foam may be reported and represents the ability of the dendritic macromolecule to generate firmness in the isocyanate based foam matrix. The load efficiency is defined as the number of Newtons of foam hardness increase per % of the dendritic macromolecule in the resin blend. The term "load efficiency", as used throughout this specification, is intended to have the meaning set out in this paragraph.

As shown, the introduction of the dendritic macromolecule resulted in a foam hardness increase of 181N. The resulting load efficiency is 27N/% dendritic macromolecule in the resin.

In Examples P and Q, isocyanate-based foams based on the formulations shown in Table 7 were produced using the General Procedure referred to above.

In Examples P and Q, isocyanate based foams were prepared in the absence of any dendritic macromolecule and used only copolymer polyol as the method by which foam hardness is increased. Thus, it will be appreciated that Examples P and Q are provided for comparative purposes. The isocyanate-based foams were formulated with a % $H_2O$ concentration of 3.8% resulting in an approximate foam core density of 31 kg/m³. The level of the copolymer polyol was varied from 26% to 8% by weight in the resin.

The results of physical property testing are reported in Table 7. As shown, the introduction of the copolymer polyol resulted in a foam hardness increase of 192.1 N. The resulting load efficiency is 10.69 N/% copolymer polyol in the resin. As will be apparent, this is significantly less than the load efficiency achieved in the foams produced in Examples M to O.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

TABLE 1

|  | Example | | | |
|---|---|---|---|---|
| Ingredient | 1 | 2 | 3 | 4 |
| E837 | 80.33 | 70.32 | 77.2 | 67.24 |
| E850 | 17.52 | 27.53 | 17.44 | 27.4 |
| HBP | 2.15 | 2.15 | 5.36 | 5.36 |
| DEOA LF | 0.91 | 0.91 | 0.91 | 0.91 |
| Glycerin | 0.51 | 0.51 | 0.51 | 0.51 |
| $H_2O$ | 3.95 | 3.95 | 3.95 | 3.95 |
| Dabco 33LV | 0.53 | 0.53 | 0.53 | 0.53 |
| Niax A-1 | 0.08 | 0.08 | 0.08 | 0.08 |
| DC5169 | 0.04 | 0.04 | 0.04 | 0.04 |
| Y10184 | 1.1 | 1.1 | 1.1 | 1.1 |
| Total resin | 107.13 | 107.13 | 107.13 | 107.13 |
| Lupranate T80 | 48.72 | 48.72 | 49.33 | 49.33 |
| Index | 100 | 100 | 100 | 100 |
| % $H_2O$ | 3.8 | 3.8 | 3.8 | 3.8 |
| % SAN in resin | 7 | 11 | 7 | 11 |
| % HBP in resin | 2 | 2 | 5 | 5 |
| Total dry weight (g) | 504 | 504 | 510 | 514 |
| Density (kg/m³) | 31 | 31 | 31 | 31 |
| 50% IFD (N) | 289 | 320 | 359 | 420 |

TABLE 2

|  | Example | | | |
|---|---|---|---|---|
| Ingredient | 5 | 6 | 7 | 8 |
| E837 | 80.5 | 70.58 | 77.41 | 67.54 |
| E850 | 17.37 | 27.29 | 17.28 | 27.16 |
| HBP | 2.13 | 2.13 | 5.31 | 5.31 |
| DEOA LF | 0.91 | 0.91 | 0.91 | 0.91 |
| Glycerin | 0.51 | 0.51 | 0.51 | 0.51 |
| $H_2O$ | 3.28 | 3.28 | 3.28 | 3.28 |
| Dabco 33LV | 0.53 | 0.53 | 0.53 | 0.53 |
| Niax A-1 | 0.08 | 0.08 | 0.08 | 0.08 |
| DC5169 | 0.04 | 0.04 | 0.04 | 0.04 |
| Y10184 | 1.1 | 1.1 | 1.1 | 1.1 |
| Total resin | 106.45 | 106.45 | 106.45 | 106.45 |
| Lupranate T80 | 41.87 | 41.87 | 41.87 | 41.87 |
| Index | 100 | 100 | 100 | 100 |
| % $H_2O$ | 3.2 | 3.2 | 3.2 | 3.2 |
| % SAN in resin | 7 | 11 | 7 | 11 |
| % HBP in resin | 2 | 2 | 5 | 5 |
| Total dry weight (g) | 572 | 576 | 578 | 576 |
| Density (kg/m³) | 36 | 36 | 36 | 36 |
| 50% IFD (N) | 294 | 335 | 355 | 407 |

TABLE 3

|  | Example | | |
|---|---|---|---|
| Ingredient | 9 | 10 | 11 |
| E837 | 92.8 | 89.2 | 85.6 |
| E850 | — | — | — |
| HBP | 7.2 | 10.8 | 14.4 |
| DEOA LF | 1.1 | 1.1 | 1.1 |
| Glycerin | 0.6 | 0.6 | 0.6 |
| $H_2O$ | 3.93 | 3.93 | 3.93 |
| Dabco 33LV | 0.411 | 0.452 | 0.492 |
| Niax A-1 | 0.08 | 0.08 | 0.08 |
| DC5169 | — | — | — |
| Y10184 | 1 | 1 | 1 |
| Total resin | 107.12 | 107.16 | 107.2 |
| Lupranate T80 | 51.737 | 53.197 | 54.658 |
| Index | 100 | 100 | 100 |
| % $H_2O$ | 3.8 | 3.8 | 3.8 |
| % SAN in resin | 0 | 0 | 0 |
| % HBP in resin | 6.68 | 10.01 | 13.35 |
| Total dry weight (g) | 476 | 471 | 473 |
| Density (kg/m³) | 31 | 31 | 31 |
| 50% IFD (N) | 301.6 | 399.9 | 482.6 |
| % Hysteresis | 34.9 | 39.3 | 42.6 |
| Load Efficiency |  | 27.13 |  |

TABLE 4

|  | Example | | |
|---|---|---|---|
| Ingredient | 12 | 13 | 14 |
| E837 | 92.8 | 89.2 | 85.6 |
| E850 | — | — | — |
| HBP | 7.2 | 10.8 | 14.4 |
| DEOA LF | 1.1 | 1.1 | 1.1 |
| Glycerin | 0.6 | 0.6 | 0.6 |
| $H_2O$ | 3.24 | 3.24 | 3.24 |
| Dabco 33LV | 0.411 | 0.452 | 0.492 |
| Niax A-1 | 0.08 | 0.08 | 0.08 |
| DC5169 | — | — | — |
| Y10184 | 1 | 1 | 1 |
| Total resin | 106.43 | 106.47 | 106.51 |
| Lupranate T80 | 45.067 | 46.527 | 47.988 |
| Index | 100 | 100 | 100 |
| % $H_2O$ | 3.2 | 3.2 | 3.2 |

TABLE 4-continued

| Ingredient | Example 12 | Example 13 | Example 14 |
|---|---|---|---|
| % SAN in resin | 0 | 0 | 0 |
| % HBP in resin | 6.72 | 10.08 | 13.43 |
| Total dry weight (g) | 554 | 554 | 550 |
| Density (kg/m$^3$) | 36 | 36 | 36 |
| 50% IFD (N) | 307 | 412.8 | 509.5 |
| % Hysteresis | 28.6 | 37.3 | 43.9 |
| Load Efficiency | | 30.18 | |

TABLE 5

| Ingredient | Example 15 | Example 16 |
|---|---|---|
| E837 | 34.85 | 79.65 |
| E850 | 65.15 | 20.05 |
| HBP | — | — |
| DEOA LF | 1.1 | 1.1 |
| Glycerin | 06. | 0.6 |
| H$_2$O | 3.93 | 3.93 |
| Dabco 33LV | 0.33 | 0.33 |
| Niax A-1 | 0.08 | 0.08 |
| DC5169 | — | — |
| Y10184 | 1 | 1 |
| Total resin | 107.04 | 107.04 |
| Lupranate T80 | 40.817 | 41.432 |
| Index | 100 | 100 |
| % H$_2$O | 3.8 | 3.8 |
| % SAN in resin | 26 | 8 |
| % HBP in resin | 0 | 0 |
| Total dry weight (g) | 550 | 556 |
| Density (kg/m$^3$) | 31 | 31 |
| 50% IFD (N) | 468.4 | 276.3 |
| % Hysteresis | 38.4 | 29.1 |
| Load Efficiency | | 10.69 |

TABLE 6

| Ingredient | Example M | Example N | Example O |
|---|---|---|---|
| E837 | 92.8 | 89.2 | 85.6 |
| E850 | — | — | — |
| HBP | 7.2 | 10.8 | 14.4 |
| DEOA LF | 1.1 | 1.1 | 1.1 |
| Glycerin | 0.6 | 0.6 | 0.6 |
| H$_2$O | 3.93 | 3.93 | 3.93 |
| Dabco 33LV | 0.411 | 0.452 | 0.492 |
| Niax A-1 | 0.08 | 0.08 | 0.08 |
| Y10184 | 1 | 1 | 1 |
| Total resin | 107.12 | 107.16 | 107.2 |
| Lupranate T80 | 51.737 | 53.197 | 54.658 |
| Index | 100 | 100 | 100 |
| % H$_2$O | 3.8 | 3.8 | 3.8 |
| % SAN in resin | 0 | 0 | 0 |
| % HBP in resin | 6.68 | 10.01 | 13.35 |
| Total dry weight (g) | 476 | 471 | 473 |
| Density (kg/m$^3$) | 31 | 31 | 31 |
| 50% IFD (N) | 301.6 | 399.9 | 482.6 |
| % Hysteresis | 34.9 | 39.3 | 42.6 |
| Load Efficiency | | 27.13 | |

TABLE 7

| Ingredient | Example P | Example Q |
|---|---|---|
| E837 | 34.85 | 79.95 |
| E850 | 65.15 | 20.05 |
| HBP | — | — |
| DEOA LF | 1.1 | 1.1 |
| Glycerin | 0.6 | 0.6 |
| H$_2$O | 3.93 | 3.93 |
| Dabco 33LV | 0.33 | 0.33 |
| Niax A-1 | 0.08 | 0.08 |
| Y10184 | 1 | 1 |
| Total resin | 107.04 | 107.04 |
| Lupranate T80 | 40.817 | 41.432 |
| Index | 100 | 100 |
| % H$_2$O | 3.8 | 3.8 |
| % SAN in resin | 26 | 8 |
| % HBP in resin | 0 | 0 |
| Total dry weight (g) | 550 | 556 |
| Density (kg/m$^3$) | 31 | 31 |
| 50% IFD (N) | 468.4 | 276.3 |
| % Hysteresis | 38.4 | 29.1 |
| Load Efficiency | | 10.69 |

What is claimed is:

1. A foamed isocyanate-based polymer derived from:
an isocyanate; and
an active hydrogen-containing compound;
the polymer having a cellular matrix comprising a plurality of interconnected struts;
a dendritic macromolecule which forms a stable liquid at 23° C. when (i) at least about 15% by weight of said dendritic macromolecule is mixed with (ii) a polyether polyol having an OH number less than about 40 mg KOH/g, and which confers to the cellular matrix a load efficiency of at least about 15 Newtons/weight % active hydrogen-containing compound; and
a blowing agent.

2. The foamed isocyanate-based polymer defined in claim 1, wherein the active hydrogen-containing compound confers to the cellular matrix a load efficiency in the range of from about 15 to about 50 Newtons/weight % active hydrogen-containing compound.

3. The foamed isocyanate-based polymer defined in claim 1, wherein the active hydrogen-containing compound confers to the cellular matrix a load efficiency in the range of from about 20 to about 45 Newtons/weight % active hydrogen-containing compound.

4. The foamed isocyanate-based polymer defined in claim 1, wherein the active hydrogen-containing compound confers to the cellular matrix a load efficiency in the range of from about 25 to about 35 Newtons/weight % active hydrogen-containing compound.

5. The foamed isocyanate-based polymer defined in claim 1, wherein the cellular matrix is substantially free of particulate material.

6. The foamed isocyanate-based polymer defined in claim 5, wherein the active hydrogen-containing compound confers to the cellular matrix a load efficiency in the range of from about 15 to about 50 Newtons/weight % active hydrogen-containing compound.

7. The foamed isocyanate-based polymer defined in claim 5, wherein the active hydrogen-containing compound confers to the cellular matrix a load efficiency in the range of from about 20 to about 45 Newtons/weight % active hydrogen-containing compound.

8. The foamed isocyanate-based polymer defined in claim 5, wherein the active hydrogen-containing compound confers to the cellular matrix a load efficiency in the range of from about 25 to about 35 Newtons/weight % active hydrogen-containing compound.

9. A foamed isocyanate-based polymer derived from a reaction mixture comprising:
an isocyanate;
an active hydrogen-containing compound;
a dendritic macromolecule which forms a stable liquid at 23° C. when (i) at least about 15% by weight of said dendritic macromolecule is mixed with (ii) a polyether polyol having an OH number less than about 40 mg KOH/g, and which confers to the cellular matrix of said foamed isocyanate-based polymer a load efficiency of at least about 15 Newtons/weight % active hydrogen-containing compound; and
a blowing agent;
the foamed isocyanate-based polymer having an Indentation Force Deflection loss when measured pursuant to ASTM D3574 which is less than that of a reference foam produced by substituting a copolymer polyol for the dendritic macromolecule in the reaction mixture, the foamed isocyanate-based polymer and the reference foam having substantially the same density and Indentation Force Deflection when measured pursuant to ASTM D3574.

10. A foamed isocyanate-based polymer derived from a reaction mixture comprising:
an isocyanate;
an active hydrogen-containing compound;
a dendritic macromolecule which forms a stable liquid at 23° C. when (i) at least about 15% by weight of said dendritic macromolecule is mixed with (ii) a polyether polyol having an OH number less than about 40 mg KOH/g, and which confers to the cellular matrix of said foamed isocyanate-based polymer a load efficiency of at least about 15 Newtons/weight % active hydrogen-containing compound; and
a blowing agent;
the foamed isocyanate-based polymer having thickness loss when measured pursuant to ASTM D3574 which is less than that of a reference foam produced by substituting a copolymer polyol for the dendritic macromolecule in the reaction mixture, the foamed isocyanate-based polymer and the reference foam having substantially the same density and Indentation Force Deflection when measured pursuant to ASTM D3574.

11. A process for producing a foamed isocyanate-based polymer comprising the steps of:
contacting an isocyanate, an active hydrogen-containing compound, a dendritic macromolecule and a blowing agent to form a reaction mixture, wherein the dendritic macromolecule (i) forms a stable liquid at 23° C. when at least about 15% by weight of said dendritic macromolecule is mixed with a polyether polyol having an OH number less than about 40 mg KOH/g, and (ii) confers to the cellular matrix of said foamed isocyanate-based polymer a load efficiency of at least about 15 Newtons/weight % active hydrogen-containing compound; and
expanding the reaction mixture to produce the foamed isocyanate-based polymer.

12. The process defined in claim 11, wherein the active hydrogen-containing compound is selected from the group consisting of polyols, polyamines, polyamides, polyimines and polyolamines.

13. The process defined in claim 11, wherein the active hydrogen-containing compound comprises a polyol.

14. The process defined in claim 13, wherein the polyol comprises a hydroxyl-terminated backbone of a member selected from the group consisting of polyether, polyesters, polycarbonate, polydiene and polycaprolactone.

15. The process defined in claim 13, wherein the polyol is selected from the group consisting of hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols, polyalkyleneether triols and mixtures thereof.

16. The process defined in claim 13, wherein the polyol is selected from the group consisting of adipic acid-ethylene glycol polyester, poly(butylene glycol), poly(propylene glycol) and hydroxyl-terminated polybutadiene.

17. The process defined in claim 13, wherein the polyol is a polyether polyol.

18. The process defined in claim 17, wherein the polyether polyol has a molecular weight in the range of from about 200 to about 10,000.

19. The process defined in claim 17, wherein the polyether polyol has a molecular weight in the range of from about 2000 to about 7,000.

20. The process defined in claim 17, wherein the polyether polyol has a molecular weight in the range of from about 2,000 to about 6,000.

21. The process defined in claim 11, wherein the active hydrogen-containing compound is selected from group consisting of a polyamine and a polyalkanolamine.

22. The process defined in claim 21, wherein the polyamine is selected from the group consisting of primary and secondary amine terminated polyethers.

23. The process defined in claim 11, wherein the polyether have a molecular weight of greater than about 230.

24. The process defined in claim 11, wherein the polyether have a functionality of from about 2 to about 6.

25. The process defined in claim 11, wherein the polyether have a molecular weight of greater than about 230 and a functionality of from about 1 to about 3.

26. The process defined in claim 11, wherein the isocyanate is represented by the general formula: $Q(NCO)_i$ wherein i is an integer of two or more and Q is an organic radical having the valence of i.

27. The process defined in claim 11, wherein the isocyanate is selected from the group consisting of hexamethylene diisocyanate, 1,8-diisocyanato-p-methane, xylyl diisocyanate, $(OCNCH_2CH_2CH_2OCH_2O)_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4"-triisocyanate, isopropylbenzene-alpha-4-diisocyanate and mixtures thereof.

28. The process defined in claim 11, wherein the isocyanate comprises a prepolymer.

29. The process defined in claim 11, wherein isocyanate is selected from the group consisting of 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanatocyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof.

30. The process defined in claim 11, wherein the isocyanate is selected from the group consisting of 2,4-toluene diisocyanate, 2,6-toluene diisocyanate and mixtures thereof.

31. The process defined in claim 11, wherein the isocyanate is selected from the group consisting of (i) 2,4'-diphenylmethane diisocyanate, 4,4'-diphenylmethane diisocyanate and mixtures thereof; and (ii) mixtures of (i) with an isocyanate selected from the group comprising 2,4-toluene diisocyanate, 2,6-toluene diisocyanate and mixtures thereof.

32. The process defined in claim 11, wherein the blowing agent comprises water.

33. The process defined in claim 32, wherein the water is used in an amount in the range of from about 0.5 to about 40 parts by weight per 100 parts by weight of active hydrogen-containing compound used in the reaction mixture.

34. The process defined in claim 32, wherein the water is used in an amount in the range of from about 1.0 to about 10 parts by weight per 100 parts by weight of active hydrogen-containing compound used in the reaction mixture.

35. The process defined in claim 11, wherein dendritic macromolecule has the following characteristics: (i) an active hydrogen content of greater than about 3.8 mmol/g; (ii) an active hydrogen functionality of at least about 8; and (iii) at least a 15% by weight of the dendritic macromolecule may be mixed with a polyether polyol having an OH number less than about 40 mg KOH/g to form a stable liquid at 23° C.

36. The process defined in claim 35, wherein a mixture comprising from about 15% to about 30% by weight of the dendritic macromolecule and a polyether polyol having an OH number less than about 40 mg KOH/g forms a stable liquid at 23° C.

37. The process defined in claim 35, wherein a mixture comprising at least about 15% by weight of the dendritic macromolecule and a polyether polyol having an OH number in the range of from about 25 to 35 mg KOH/g fauns a stable liquid at 23° C.

38. The process defined in claim 35, wherein the active hydrogen is present in the macromolecule in the form of one or more mercapto moieties.

39. The process defined in claim 35, wherein the active hydrogen is present in the macromolecule in the form of one or more primary amino moieties.

40. The process defined in claim 35, wherein the active hydrogen is present in the macromolecule in the form of one or more secondary amino moieties.

41. The process defined in claim 35, wherein the active hydrogen is present in the macromolecule in the form of one or more hydroxyl moieties.

42. The process defined in claim 35, wherein the active hydrogen is present in the macromolecule in the form of two or more of a mercapto moiety, a primary amino moiety, a secondary amino moiety and a hydroxyl moiety.

43. The process defined in claim 35, wherein the active hydrogen content of the macromolecule is in the range of from about 3.8 to about 10 mmol/g.

44. The process defined in claim 35, wherein the active hydrogen content of the macromolecule is in the range of from about 3.8 to about 7.0 mmol/g.

45. The process defined in claim 35, wherein the active hydrogen content of the macromolecule is in the range of from about 4.4 to about 5.7 mmol/g.

46. The process defined in claim 35, wherein the active hydrogen functionality in the macromolecule is in the range of from about 8 to about 70.

47. The process defined in claim 35, wherein the active hydrogen functionality in the macromolecule is in the range of from about 10 to about 60.

48. The process defined in claim 35, wherein the active hydrogen functionality in the macromolecule is in the range of from about 15 to about 35.

49. The process defined in claim 35, wherein the active hydrogen functionality in the macromolecule is in the range of from about 20 to about 30.

50. The process defined in claim 35, wherein a mixture comprising from about 15% to about 50% by weight of the dendritic macromolecule and a polyether polyol having an OH number less than about 40 mg KOH/g forms a stable liquid at 23° C.

51. The process defined in claim 35, wherein a mixture comprising from about 15% to about 40% by weight of the dendritic macromolecule and a polyether polyol having an OH number less than about 40 mg KOH/g forms a stable liquid at 23° C.

52. The process defined in claim 35, wherein the macromolecule has an inherently branched structure consisting of at least one of an ester moiety, an ether moiety, an amine moiety, an amide moiety and any mixtures thereof.

53. The process defined in claim 35, wherein the macromolecule has an inherently branched structure comprising primarily an ester moiety, optionally combined with an ether moiety.

54. The process defined in claim 35, wherein the macromolecule has an inherently branched structure comprising primarily an ether moiety, optionally combined with an ester moiety.

55. The process defined in claim 35, wherein the macromolecule has an inherently branched structure comprising primarily an ester moiety, optionally combined with an ether moiety.

56. The process defined in claim 52, wherein the macromolecule further consists of a nucleus to which the inherently branched structure is chemically bonded.

57. The process defined in claim 52, wherein a plurality of inherently branched structures are chemically bonded to one another.

58. The process defined in claim 52, wherein the inherently branched structure has at least one chain stopper moiety chemically bonded thereto.

59. The process defined in claim 52, wherein the inherently branched structure has at least two different chain stopper moieties chemically bonded thereto.

60. The process defined in claim 52, wherein the inherently branched structure has at least one spacing chain extender chemically bonded thereto.

61. The process defined in claim 60, wherein the spacing chain extender is monomeric.

62. The process defined in claim 60, wherein the spacing chain extender is polymeric.

* * * * *